United States Patent [19]

Karobath et al.

[11] 4,053,273
[45] Oct. 11, 1977

[54] APPARATUS FOR THE MANUFACTURE OF PRESSED BODIES OF DEPOLARIZING MATERIAL FOR GALVANIC CELLS

[75] Inventors: Ernst Karobath; Leopold Rippel; Wolfgang Pulitzer; Hans Schmidinger, all of Vienna, Austria

[73] Assignee: Telephon- und Telegraphen-Fabriks-Aktiengesellschaft Kapsch & Sohne in Wien, Vienna, Austria

[21] Appl. No.: 667,100

[22] Filed: Mar. 15, 1976

[30] Foreign Application Priority Data

Apr. 4, 1975 Austria ................. 2573/75

[51] Int. Cl.² .................... B30B 11/10; B30B 15/30
[52] U.S. Cl. .................... 425/357; 425/361; 425/DIG. 123; 425/574
[58] Field of Search ............ 425/242 R, 246, 357–359, 425/361, 412, 422, 423, DIG. 123

[56] References Cited

U.S. PATENT DOCUMENTS 168,743  10/1875  Haws ................. 425/242 R

FOREIGN PATENT DOCUMENTS 259,753  5/1913  Germany ................. 425/361

1,019,558  2/1966  United Kingdom ................. 425/246

Primary Examiner—Robert D. Baldwin
Attorney, Agent, or Firm—Ernest F. Marmorek

[57] ABSTRACT

Apparatus for the manufacture of pressed bodies of depolarizing material for galvanic cells, comprising an elongated mold of uniform cross section having an open end, a pre-mold having an internal volume which is a multiple of the internal volume of said mold, and consisting of a first part and a second part, said first part being elongated and of uniform cross section larger than said cross section of the mold, said second part extending from said first part to an outlet opening and diminishing in cross section from said first part to said outlet opening, said oulet opening being of approximately the same size and shape as said cross section of said mold, a press plunger movable with clearance in said first part of the pre-mold, a first device for refilling said pre-mold prior to each stroke of said press plunger into said first part, a second device for bringing said open end of the mold into alignment with said outlet opening and for moving said open end out of alignment with said outlet opening and thereby shearing material within said apparatus, and means for driving said press plunger, said first device and said second device in synchronism.

12 Claims, 2 Drawing Figures

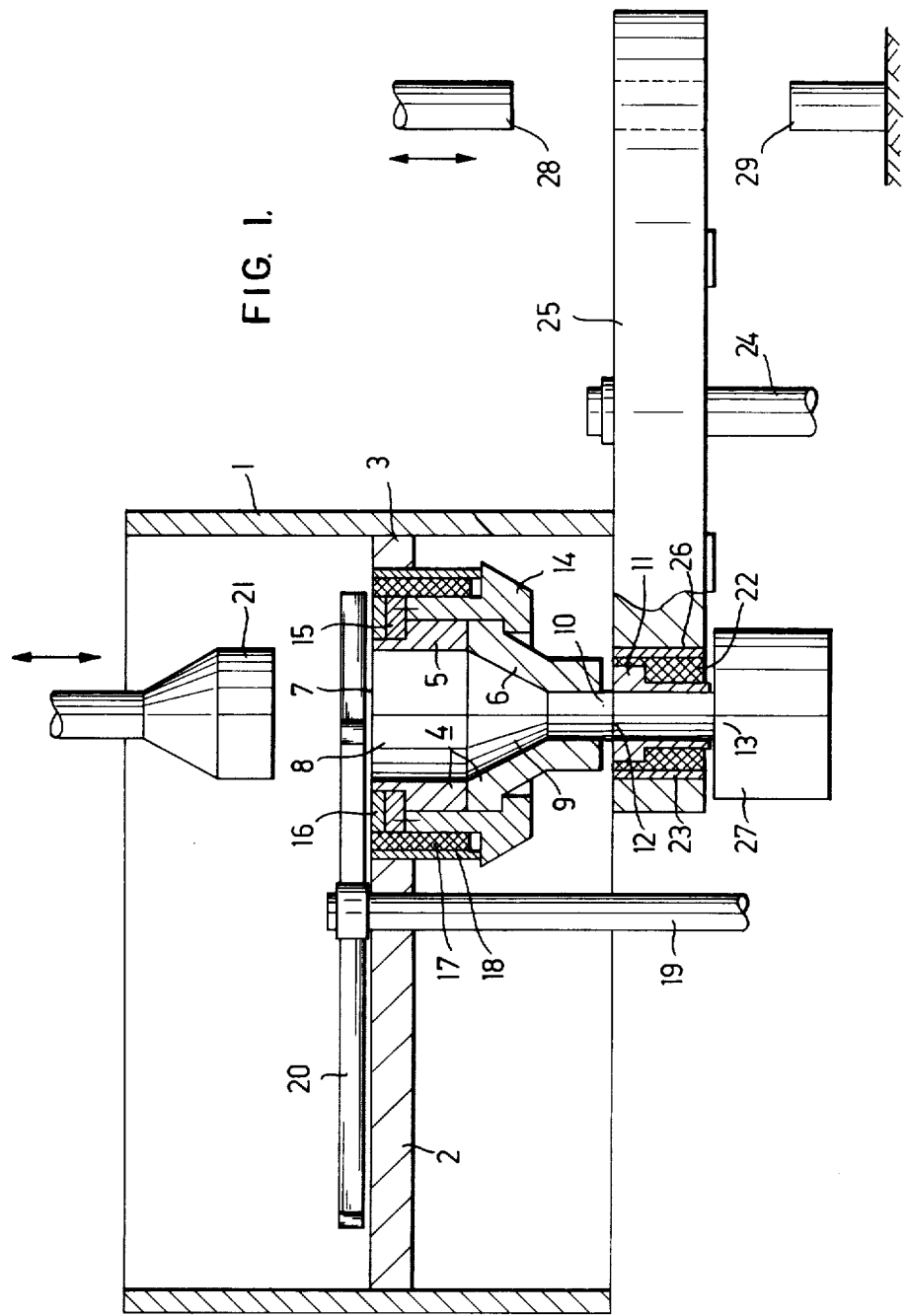

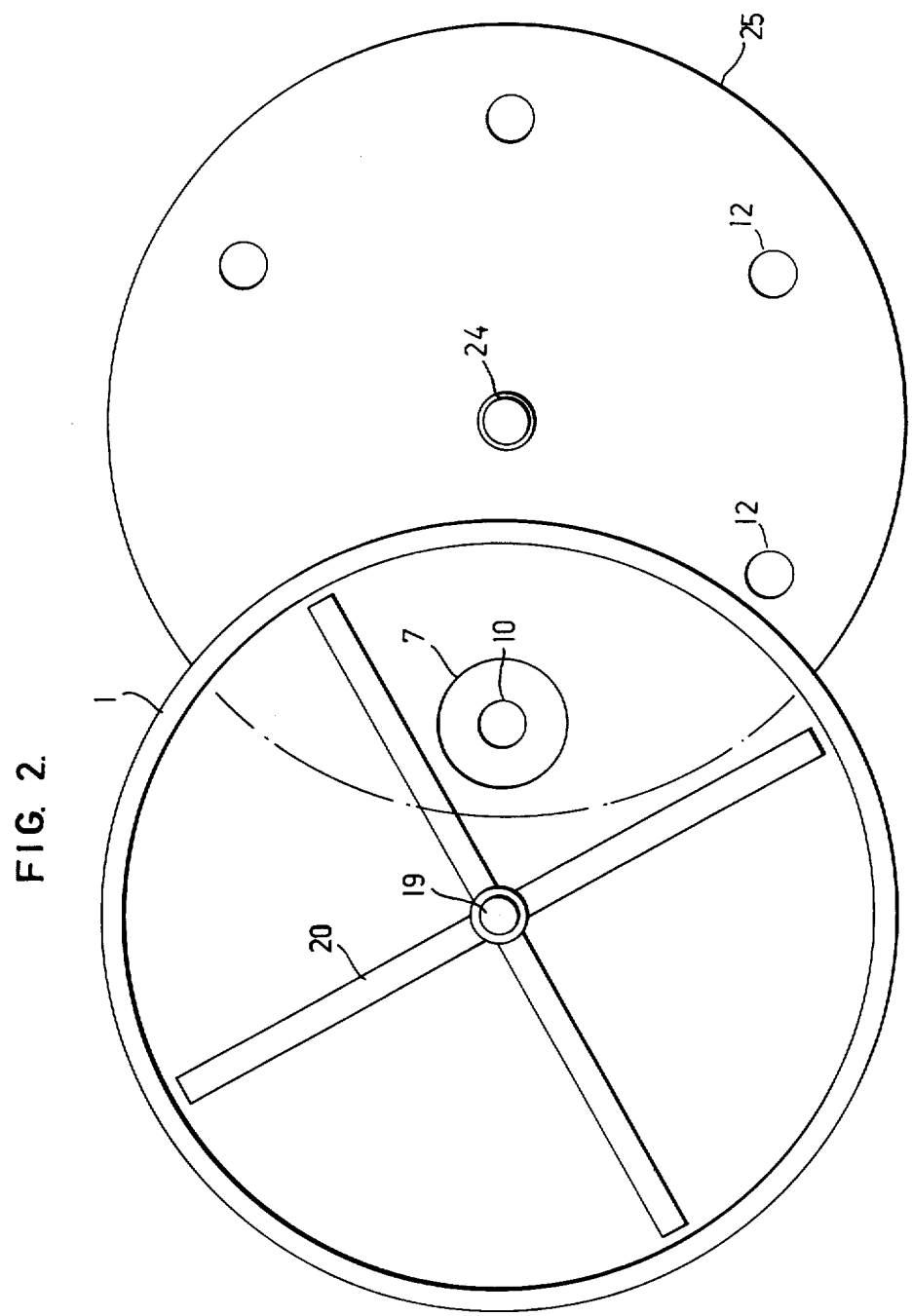

APPARATUS FOR THE MANUFACTURE OF PRESSED BODIES OF DEPOLARIZING MATERIAL FOR GALVANIC CELLS

In the manufacture of galvanic cells it is necessary to consolidate the depolarising material by a pressing operation into a pressed body, the so-called "dolly". For example, in Leclanche cells the depolarising material consists of a mixture of carbon black, graphite, manganese and ammonium chloride, moistened with a salt solution. In mass production of galvanic cells, economy allows only a short time, e.g. half a second or less, for pressing of the dollies.

Hitherto, mechanical crank-driven presses have usually been employed in which the press molds correspond in size and shape to the pressed bodies to be produced, and in each cycle of operation are filled with material to be pressed, by a refilling device, this material thereupon being consolidated by the crank-driven press plunger.

Pressing devices also exist in which the material to be pressed is not consolidated in a single working stroke of the working cycle, but in several working strokes with employment of several press plungers, which cooperate successively with the same press mold, with intermediate filling up of the latter.

The following fundamental disadvantages are attached to the pressing devices referred to If the press plunger is driven directly from the crankshaft of the press, without interposition of spring links, one obtains pressed bodies of a predetermined length, but of non-uniform density, because before each press stroke the press mold is in fact filled with material which is not of uniform density, and the charge is always pressed together until the dead centre position of the press plunger is reached.

This is particularly relevant if pressing takes place in a plurality of working strokes with employment of a plurality of press plungers. In this case, each finished pressed body may consist of a series of tablet-like portions of different densities superimposed on one another.

If on the other hand, one uses a press in which the press plunger is driven with interposition of a mechanical or pneumatic spring, then indeed the density of the pressed bodies obtained is more uniform, but the pressed bodies have different lengths, because then the respective press stroke, and hence the length of each pressed body, is dependent on the mechanical resistance of the material which has been charged into the mold.

Regardless of whether one operates with a rigid or a resilient press plunger, it frequently is also the case that the material to be pressed remains adhering to the press plunger. This material, during the outward stroke of the press plunger, is torn away from the finished pressed body, and one thus obtains in both cases pressed bodies with different lengths.

The invention therefore concerns itself with the object of producing a press apparatus which makes it possible to avoid these sources of failure and to produce pressed bodies which are substantially of uniform density and have the same dimensions among themselves.

Apparatus constructed according to the invention for manufacture of pressed bodies of depolarising material for galvanic cells has a cylindrical or prismatic mold and a driven press plunger. Arranged in series with the mold is a pre-mold, the internal volume of which is a multiple of the internal volume of the mold, and which has a filling opening which is substantially larger than the filling opening of the mold, while a first part (usually the upper part) of the pre-mold has a cylindrical or prismatic interior, into which the press plunger can be moved with clearance, while the interior of the following part of the pre-mold contracts to an outlet opening, preferably by continuous diminution of cross section, the opening being of at least approximately the same size and shape as the filling opening of the press mold. Devices synchronised with the working cycle of the press plunger are provided for refilling the pre-mold before each press operation, and to produce a shearing movement between the mold and the pre-mold after each pressing operation.

What is achieved by such apparatus is that the material to be pressed, on its way to the actual pressing mold, is pre-compressed in the pre-mold by repeated action of the press plunger and by the diminishing cross section of the interior of the pre-mold, and attains a final density on being pushed into the mold, so that in total a relatively long effective period of pressing is produced, as a result of which the quality of the pressed body is substantially improved over that produced hitherto. The pressed body obtained in the mold is then separated from the material in the pre-mold by a relative shearing movement between the mold and the pre-mold, so that pressed bodies of uniform length are always obtained. The press plunger does not come into direct contact at all with the pressed bodies in the mold, so that the quality and the dimensions of the pressed bodies cannot be diminished by material remaining stuck to the press plunger.

If one wished to produce galvanic cells which are of a specially high quality, with exceptional storage ability, then the pressed bodies must be consolidated in such a way that, during the pressing operation, the existing structure of the mixture forming the material to be pressed, consisting of solid particles, drops of liquid, and intersticial air is destroyed, and in consequence pressed bodies are produced in which all spaces in the mixture after consolidation are totally filled up with liquid electrolyte. In order to attain this optimum pressing, a high pressing force (pressure of 50 to 100 atmospheres) is necessary, which acts on the mixture with the same intensity during the entire working stroke. Thus, despite the short period of stroke available, one achieves a sufficient final consolidation of the material, which has already been pre-consolidated in the pre-mold. Since the normal crank-driven presses do not satisfy this requirement, because they exert their maximum pressing force only for a very short time, namely at the dead centre of the crank drive, hydraulic or pneumatic presses are preferably employed for the pressing operation. Apart from the advantage of the constancy with time of the pressing force, a hydraulic or pneumatic press has the further advantage, that a substantial protection of the entire manufacturing machine is achieved, because the high pressing forces no longer have to be withstood by the mechanical drive of this machine.

In a preferred embodiment of the invention a plurality of press molds are provided, open at both ends, in a plate which is movable, preferably rotatable, below the outlet opening of the pre-mold, and the filling openings of these molds are able to register alternately with the outlet opening of the pre-mold; and below the movable plate there is arranged a mold floor, stationary and in alignment with the outlet opening of the pre-mold, which closes at the bottom whichever press mold is at the time in the filling position. In this way a particularly high productivity can be achieved.

A preferred example of an embodiment of the invention, in which yet further features of the invention will be explained, is shown in the accompanying drawings. In these drawings:

FIG. 1 is a schematic vertical section of an apparatus; and

FIG. 2 is a plan of the same apparatus.

The floor 2 member of a cylindrical container 1 which is open upwards has an eccentric circular opening 3, which serves to receive a pre-mold which, in the example shown, is constituted by two separate components, namely parts 5 and 6. Below the pre-mold 5,6 there is a circular plate 25 in which are mounted a plurality of identical molds 11, each of which has a vertical cylindrical interior, open at both ends.

The upper part 5 of the pre-mold has a circular filling opening 7 and a cylindrical interior 8. The lower part 6 of the pre-mold 4 has an interior 9 which contracts conically from the cross section of the interior 8 of the upper pre-mold part 5 to an outlet opening 10, which is at least approximately the same size and shape as the filling opening 12 of an actual mold 11. Between the conical portion of the interior 9 and the outlet opening 10 of the lower pre-mold part 6 there is advantageously provided a cylindrical interior portion. The volumes of the interiors 8 and 9 of the pre-mold 4 are together several times, say five times, greater than the volume of the interior 13 of the mold 11, which will later be described in more detail.

In the cylindrical interior 8 of the upper pre-mold part 5 there can be inserted a press plunger 21, preferably driven hydraulically or pneumatically. The plunger 21 is movable with clearance in the part 5 so that air squeezed out from the material being pressed can escape through the clearance. The joint between the two pre-mold parts 5 and 6 lies below the lower end of the stroke of the press plunger 21, during normal operation of the press.

The two pre-mold parts 5 and 6 are connected by a cap 14 which engages over a flange of the pre-mold part 6 and surrounds the pre-mold part 5, and by a ring 15 engaging in a step of the pre-mold part 5, which is screwed together with the cap 14. The ring 15 is covered above by a smooth ring 16, and the pre-mold unit thus made is secured in the bore 3 of the floor 2 by means of a resilient insert 17, e.g. of rubber, and a metal sleeve 18. The smooth ring 16 consists of a plastics material and serves to protect the underlying metal components against corrosion by the material to be pressed.

In the floor 2 of the container 1 there is also journalled centrally, and driven intermittently by a motor, the shaft 19 of a stirrer 20, for example of cross shape, which sweeps across the filling opening 7 of the pre-mold 4 and introduces material to be pressed into the pre-mold before each pressing operation.

Below the pre-mold 4 there is arranged the circular plate 25 which is intermittently rotatable about a vertical shaft 24. In this plate there are arranged molds distributed uniformly around a circle and open at both ends. These molds either are constituted directly by cylindrical openings extending through the thickness of the plate, with a cross section corresponding to the filling opening 12, or are inserted into correspondingly larger dimensioned openings. For example, the mold 11 shown in FIG. 1 is mounted by means of a resilient insert 22 and a metal sleeve 23 in a larger-dimensioned hole 26 in the plate 25.

Below the rotatable plate 25, in alignment with the outlet opening 10 of the pre-mold 4, there is arranged a stationary mold floor 27, which closes at the bottom whichever mould 11 is at the time in the filling position.

Between the pre-mold 4 and the rotatable plate 25, as well as between the rotatable plate 25 and the stationary mold floor 27, there are provided running clearances, and the pre-mold 4 and a portion of the rotatable plate 25 are able to yield, by reason of the resilient inserts 17 or 22 already mentioned, to such an extend that they can be forced by the pressing pressure exerted by the press plunger 21, tightly against the plate 25 or against the stationary molds floor 27, so that on the one hand the mold 11 is totally enclosed during the pressing operation, and on the other hand however, after the pressing operation, the rotary motion of the plate 25 serving to shear off the pressed body is not hindered. It has appeared to be usually desirable to make the filling opening 12 of the mold 11 somewhat different in size from the outlet opening 10 of the pre-mold 4, so that at the break-off place of the pressed body a slight step in the diameter arises, which assists a clean separation of the finished pressed body from the material present in the pre-form 4, by a shearing action.

After each partial rotation of the plate 25, the pressed body contained in the mold 11 can be pushed out at a suitable position by means of an ejector 28, for example into the paper casing of a cell sleeve 29.

In the operation of the press apparatus described, in each working cycle firstly material to be pressed is introduced into the upper pre-mold part 5 from the container 1 by means of the intermittently operated stirrer 20 which serves as a filling device, until the pre-mold is full exactly to the top. Thereupon the press plunger is lowered into the interior 9 of the upper pre-mold part 5, and by that means the material present in the pre-mold 4 is consolidated, and at the same time a part of this material which has been pre-compressed in several working cycles is displaced into that mold 11 which is at that time in the filling position and closed at the bottom by the stationary mold floor 27. After the filling of the mould 11 the pressing pressure is maintained for a short time, for final consolidation of the pressed body. The total effective pressing time is substantially longer than the short time of forcing in of the depolarising material into the mold, because of the effect of the press plunger 21 occurring in each working cycle on the material present in the pre-mold 4 and, with employment of a hydraulic or pneumatic press, also in consequence of the constant effect of the pressing pressure during the entire duration of each working stroke.

By the division of the mold into a substantially larger pre-mold 4 and a subsequent small mould 11, there is produced in the mold 11 a pressed body which is uniformly consolidated over its entire length, the longitudinal dimension of which is determined by the height of the mold 11, and which is separated from the material in the pre-mold 4 by shearing off. The edge of the outlet opening 10 of the pre-mold 4 and/or the filling opening 12 of the mold 11 is preferably made with a sharp edge for better shearing off of the pressed body.

Wear occurs practically only in the upper pre-mold part 5, in which the press plunger 21 moves. With the preferred two-part construction of the pre-mold, the upper pre-mould part 5 can easily be replaced after wear.

The invention naturally permits various alterations from the embodiment shown as an example. Thus the pre-mold and the mold can be formed with interiors of prismatic cross section, while then the tapering part of the pre-mold is preferably pyramid-shaped. In this way pressed bodies of high quality with prismatic cross section can be made. Instead of a rotatable plate, a plate which can be reciprocated translationally beneath the pre-mould can also be used as a mold carrier.

We claim

1. An apparatus for the manufacture of a pressed body of depolarizing material for use in a galvanic cell, comprising, in combination:
   at least one elongated mold having a substantially uniform cross section and being open at each end;
   a pre-mold having a capacity greater than that of said mold and being open at each end, one of the openings of said pre-mold being generally the same size and shape as the openings of said mold;
   filling means operable for filling said pre-mold with said depolarizing material;
   pressing means operable for cooperating with said pre-mold to compress and discharge the depolarizing material in said pre-mold to said mold and operable for simultaneously cooperating with said mold to press the, deplorizing material therein;
   moving means operable to move said mold to align one of its openings with said one opening of said pre-mold and to move said mold after it receives the compressed depolarizing material; and
   shearing means operable to cooperate with said moving means to shear off a portion of the compressed depolarizing material extending above the top of said mold;
   said pressing means and said moving means operable for cooperating with each other whereby said mold is moved to a position below said pre-mold, receives the compressed depolarizing material, and is thereafter moved away so that another mold can be moved to the position below said pre-mold.

2. The apparatus as claimed in claim 1, wherein said pre-mold comprises an elongated first part having a uniform cross section larger than the cross section of said mold and a second part extending from said first part and diminishing in cross section from said first part to said one opening and said pressing means includes a press plunger movable with clearance in said first part and closing means operable to close off the other opening of said mold when the depolarizing material is being compressed in said pre-mold.

3. The apparatus as claimed in claim 2, wherein the cross section of said second part reduces continuously from said first part to said mold.

4. The apparatus as claimed in claim 3, wherein a portion of said second part near said mold has a uniform cross section.

5. The apparatus as claimed in claim 2, wherein said first part and said second part are separate components.

6. The apparatus as claimed in claim 1, further comprising a plurality of said molds and said moving means comprising a plate movably mounted below said pre-mold and operable for carrying said molds into successive alignment below said one opening of said pre-mold; and said pressing means operable for simultaneously co-operating with said mold comprising a base disposed below said pre-mold for closing the other end of the mold in alignment with said pre-mold.

7. The apparatus as claimed in claim 6, wherein each of said molds is defined by a hole extending throughout the thickness of said plate.

8. The apparatus as claimed in claim 6, wherein each of said molds is defined by a lining which is mounted in respective holes extending throughout the thickness of said plate.

9. The apparatus as claimed in claim 6, wherein said plate is spaced apart from said base and said pre-mold is spaced apart from said plate and can move under force towards said plate.

10. The apparatus as claimed in claim 9, wherein said plate comprises a first resilient insert mounting said molds onto said plate and supporting means comprising a second resilient insert is operable for resiliently supporting said pre-mold.

11. The apparatus as claimed in claim 1, wherein said shearing means comprises a sharp edge forming part of the surface defining one of said openings.

12. The apparatus as claimed in claim 2, wherein said pressing means comprises a fluid-actuated device for moving said press plunger.

* * * * *